(12) United States Patent
Dierker

(10) Patent No.: US 6,275,001 B1
(45) Date of Patent: *Aug. 14, 2001

(54) DUAL-BATTERY SYSTEM

(75) Inventor: Uwe Dierker, Isenbüttel (DE)

(73) Assignee: Volkswagen AG, Wolfburg/Fallersleban (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,209

(22) Filed: Sep. 16, 1999

(30) Foreign Application Priority Data

Sep. 17, 1998 (DE) .............................. 198 42 656

(51) Int. Cl.$^7$ .......................... H01M 10/44; H01M 10/46
(52) U.S. Cl. ........................... 320/103; 320/104
(58) Field of Search .................... 320/103, 104, 320/116, 117, 135, 136; 307/10.1, 10.7, 46, 66, 151

(56) References Cited

U.S. PATENT DOCUMENTS

| 5,316,868 | 5/1994 | Dougherty et al. . | |
|---|---|---|---|
| 5,325,038 | * 6/1994 | Banzai et al. | 320/135 |
| 5,488,283 | * 1/1996 | Dougherty et al. | 307/10.1 |
| 5,726,553 | 3/1998 | Waugh . | |
| 5,764,032 | 9/1998 | Moore . | |
| 5,962,928 | 10/1999 | Schenk . | |

FOREIGN PATENT DOCUMENTS

| 38 471 769 C1 | 6/1990 | (DE) | B60R/16/04 |
|---|---|---|---|
| 40 28 242 A1 | 3/1992 | (DE) | B60R/16/04 |
| 196 51 612 A1 | 6/1998 | (DE) | H02J/9/06 |
| 0 583 630 A1 | 2/1994 | (EP) | B60R/16/02 |

* cited by examiner

Primary Examiner—Edward H. Tso
(74) Attorney, Agent, or Firm—Kenyon & Kenyon

(57) ABSTRACT

The subject invention relates to a dual-battery system, that includes a generator (1), a starter (3), a starter battery (2), a starter battery switch, a vehicle electrical system battery (5), and a control device (7), in which the starter battery (2), along with the starter battery switch that is connected in series, is connected in parallel with the generator (1), starter (3), and vehicle electrical system battery (5), and the starter battery switch can be activated by the control device (7), the starter battery switch being configured as a power MOSFET (6) whose gate is connected to the control device (7).

10 Claims, 1 Drawing Sheet

DUAL-BATTERY SYSTEM

FIELD OF THE INVENTION

This invention relates to an improved dual-battery system and a method for activating a dual-battery system.

BACKGROUND OF THE INVENTION

A known dual-battery system includes a vehicle electrical system battery and a starter battery that are connected to one another when the generator is operating, e.g., see: German Patent 38 41 769. When generator current delivery is low, this has the disadvantage that the vehicle electrical system battery is charged by charge exchange at the expense of the starter battery, if the charge state of the vehicle electrical system battery is less than that of the starter battery. With the known dual battery system, a switch is inserted between the vehicle electrical system battery (which carries the vehicle electrical system loads) and the remainder of the vehicle electrical system. That switch is opened, when the generator is not running as soon as the starter battery voltage falls below a permissible limit value. This feature protects the starter battery from complete discharge only when the generator is not running and also allows partial discharge of the starter battery. This poor condition (partial discharge) increases the initial load on the starter battery as vehicle travel begins and a charge exchange between the two batteries may take place to the detriment of the starter battery. In extreme cases, this can lead to complete discharge or destruction of the starter battery.

German Patent 40 28 242 discloses a dual-battery system in which the connection between starter battery and vehicle electrical system battery can be broken, regardless of the driving status, if the vehicle electrical system battery would otherwise be charged from the starter battery. The two batteries are connected to one another if the vehicle electrical system battery voltage is greater than the starter battery voltage. If the voltage of the vehicle electrical system battery is less than that of the starter battery, the two batteries are disconnected from one another. The disconnection can be performed in various ways, for example by cutting-off the starter battery from the rest of the vehicle electrical system. As a result, the starter battery is not subjected to the load of a discharged vehicle electrical system battery, and in working mode the generator can power the most important loads while charging the vehicle electrical system battery. The two batteries can also be disconnected from the rest of the vehicle electrical system by cutting off the vehicle electrical system battery. If an optional connection is provided between the generator and the starter battery the starter battery can be charged.

A disadvantage of the known dual-battery systems is that activation of the starter battery switch by the control device is very complex. For example, the charge states of the vehicle electrical system battery and the starter battery must be sensed in order to determine the control information.

OBJECTS AND SUMMARY OF THE INVENTION

An object of this invention is to provide a dual-battery system that simply and reliably prevents discharge of the starter battery.

The present invention provides a dual-battery system, comprising a generator, a starter, a starter battery, a starter battery switch, a vehicle electrical system battery, and a control device, in which the starter battery, along with the starter battery switch which is connected in series, is connected in parallel with the generator, starter, and vehicle electrical system battery, and the starter battery switch can be activated by the control device, wherein the starter battery switch is configured as a power MOSFET having a gate connected to the control device.

The present invention further provides a method for activating a dual-battery system as set forth in the preceding paragraph which comprises:

a) sensing initiation of a starting operation upon actuation of the starter (3) via the control device (7);

b) generating a gate voltage via the control device (7) that renders the MOSFET (6) conductive;

c) continuously sensing the drain current of the MOSFET (6) via the control device (7); and d) shutting off the gate voltage, if the drain current profile indicates termination of the starting operation via the control device (7).

Further advantageous embodiments of the invention are evident from the description below and dependent claims. Because the starter battery switch is configured as a power MOSFET, the control device can be of much simpler design. In principle, the MOSFET is always inhibited. When the starter is actuated, this causes a change in the voltage at the MOSFET that can be sensed by the control device via the drain current. Alternatively, the starter can also be connected to the control device, so that initiation of the starting operation is sensed directly. The control device then makes the MOSFET conductive, by way of a gate voltage of correct sign, so that starter current can flow from the starter battery through the MOSFET to the starter. When the starter motor begins to turn current fluctuations occur that are sensed by the control device via the drain current of the MOSFET, so that the control device can inhibit the MOSFET again by shutting off the gate voltage. As a result, the starter battery is on-load only during the actual starting operation. A further advantage of the MOSFET is that it implements a parasitic diode whose cathode is connected via the drain terminal to the starter battery. When the MOSFET is inhibited and the vehicle electrical system battery is discharged, the diode is polarized in the inhibiting direction, and no current (aside from the inhibiting current) flows through the MOSFET. If, on the other hand, the voltage difference between the vehicle electrical system battery and starter battery is greater than 0.7 V, the diode is polarized in the forward direction and a charging current can flow from the vehicle electrical system through the diode to the starter battery. The control device is thus unnecessary for the starter battery charging operation.

In a preferred embodiment, the MOSFET is configured with an integrated current measurement system, making it easier for the control device to pick off the drain current. In addition, the MOSFET is preferably configured with an internal overcurrent protector so that it shuts itself off in the event of a short circuit. A MOSFET of this kind is known, for example, under the trade name PROFET from Siemens AG.

A precrash sensor and/or crash sensor can also be associated with the control device, so that the MOSFET is inhibited when a collision is sensed. For this purpose, the vehicle electrical system battery can also have associated with it a MOSFET that is always conductive in normal operation and is inhibited only in the event of a collision.

BRIEF DESCRIPTION OF THE DRAWINGS

The invention will be explained in more detail below with reference to a preferred exemplary embodiment. The single

DETAILED DESCRIPTION OF THE INVENTION

Figure 1:
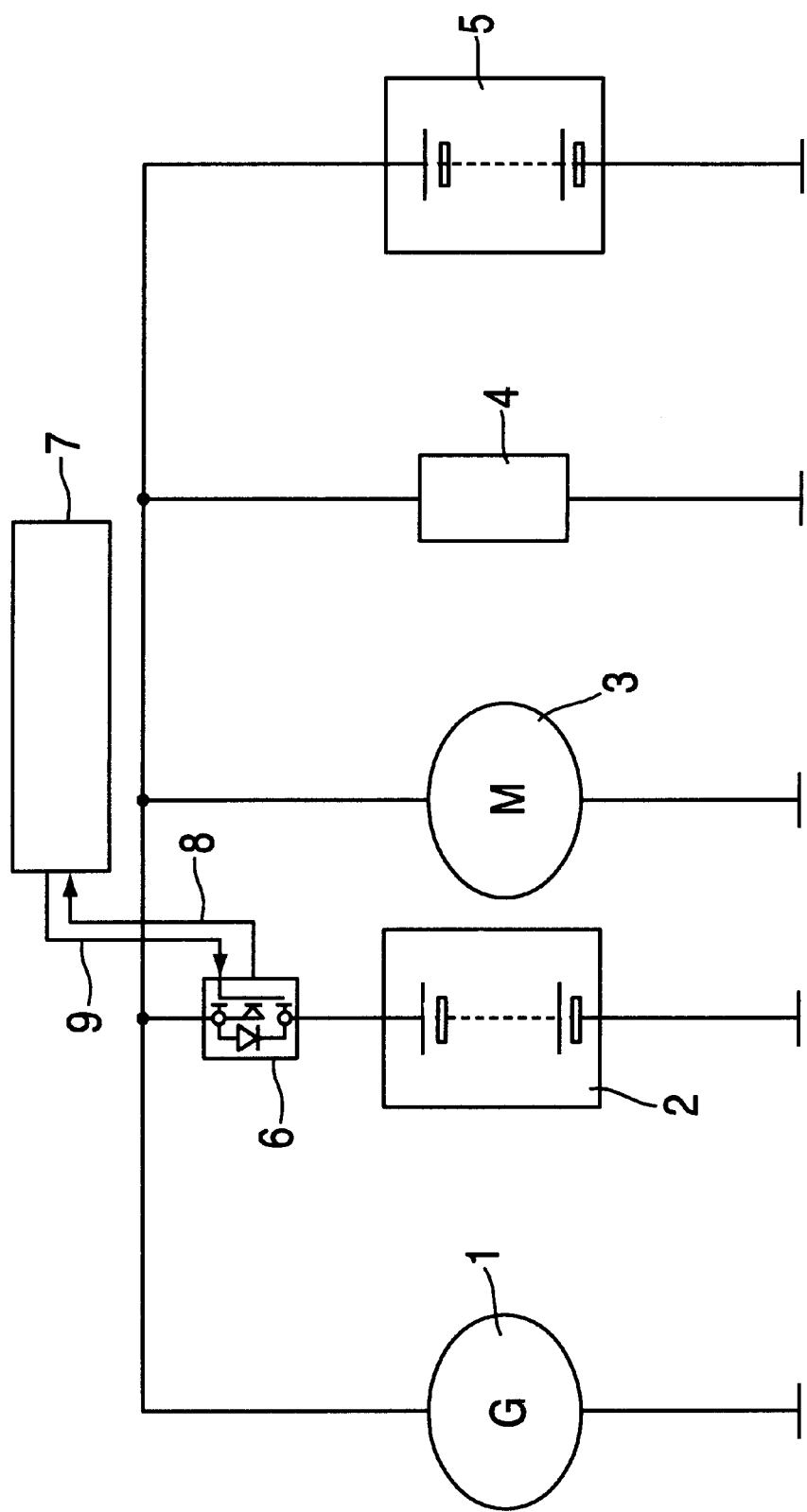
FIG. 1 shows a schematic circuit arrangement of a dual-battery system.

The dual-battery system includes a generator 1, a starter battery 2, a starter 3, a primary load 4, a vehicle electrical system battery 5, a power MOSFET 6, and a control device 7. Generator 1, starter 3, primary load 4, and vehicle electrical system battery 5 are all connected in parallel with the series circuit of starter battery 2 and MOSFET 6. MOSFET 6 is configured with an internal current measurement system whose results can be picked off at a pin accessible from outside and conveyed via a measurement line 8 to control device 7. Control device 7 is also connected via a control line 9 to the gate of MOSFET 6. The layer sequence during the manufacture of MOSFET 6 results in the formation, parallel to the actual MOSFET 6, of a parasitic diode whose cathode is connected to the drain terminal. When the vehicle is stationary and during normal driving, MOSFET 6 is disconnected from control device 7 via control line 9, so that starter battery 2 is not on-load. All the energy for operation of the vehicle electrical system is supplied only from vehicle electrical system battery 5, or from generator 1 and vehicle electrical system battery 5. When a starting operation of the motor vehicle occurs, starter 3 is actuated, for example by closing a switch in the ignition lock. This change in voltage in the starter section also results in a change in voltage at MOSFET 6, which also leads to a change in the drain current. The change in the drain current is minimal, since MOSFET 6 is still inhibited, but it is still sufficient for control device 7 to sense the initiation of the starting operation. Control device 7 then generates a gate voltage in order to activate MOSFET 6. A starting current can now flow through MOSFET 6 (which is now at low resistance) from starter battery 2 to starter 3, so that a starter motor begins to turn and attempts to start an internal combustion engine (not shown). In the event of a successful starting operation there is a characteristic current profile at the starter motor and therefore in the drain current at MOSFET 6. By analyzing the drain current, control device 7 can sense that starting has occurred and can re-inhibit MOSFET 6, so that starter battery 2 is on-load only during the actual starting operation.

The parasitic diode constitutes an integrated charging path. Specifically, if the voltage of starter battery 2 is greater than that of vehicle electrical system battery 5, no discharge of starter battery 2 can occur, since both MOSFET 6 and the diode are inhibited. If, on the other hand, the voltage of vehicle electrical system battery 5 is approximately 0.7 V higher than that of starter battery 2, then the diode is polarized in the forward direction and a charging current can flow from vehicle electrical system battery 5 to starter battery 2. This integrated charging path operates entirely independently of control device 7, so that control device 7 needs only to sense the initiation and completion of a starting operation.

MOSFET 6 may also be configured with an internal overcurrent protector, so that a short-circuit results in self-inhibition of MOSFET 6. To prevent vehicle fires in the event of an accident, control device 7 can have a precrash sensor and/or crash sensor associated with it, so that control device 7 can shut off starter battery 2 and vehicle electrical system battery 5 in the event of an accident. For this purpose, vehicle electrical system battery 5 also has associated with it a MOSFET that is always conductive in normal operation and is inhibited only in the event of an accident.

What is claimed is:

1. A dual-battery system, comprising a generator, a starter, a starter battery, a starter battery switch, a vehicle electrical system battery, and a control device, in which the starter battery is connected in series with the starter battery switch, and the starter battery and starter battery switch are connected in parallel with the generator, starter, and vehicle electrical system battery, and the starter battery switch can be activated by the control device, and wherein the starter battery switch is configured as a power MOSFET having a gate connected to the control device.

2. A dual-battery system comprising a generator, a starter, a starter battery, a starter battery switch, a vehicle electrical system battery, and a control device, in which the starter battery along with the starter battery switch that is connected in series, is connected in parallel with the generator, starter, and vehicle electrical system battery, and the starter battery switch can be activated by the control device, and wherein the starter battery switch is configured as a power MOSFET having a gate connected to the control device;

wherein the power MOSFET includes an internal current measurement system that is connected to the control device.

3. The dual-battery system as defined in claim 1 or 2, wherein the MOSFET includes an internal overcurrent protector.

4. The dual-battery system as defined in claim 1 or 2, further including at least one of a precrash sensor or crash sensor associated with the control device.

5. The dual-battery system as defined in claim 3, further including at least one of a precrash sensor or crash sensor associated with the control device.

6. The dual-battery system as defined in claim 1, 2 or 5, further comprising a second MOSFET connected in series with the vehicle electrical system battery.

7. The dual-battery system as defined in claim 3, further comprising a second MOSFET connected in series with the vehicle electrical system battery.

8. The dual-battery system as defined in claim 4, further comprising a second MOSFET connected in series with the vehicle electrical system battery.

9. A method for activating a dual-battery system including a generator, a starter, a starter battery, a starter battery switch, a vehicle electrical system battery, and a control device, in which the starter battery, along with the starter battery switch that is connected in series, is connected in parallel with the generator, starter, and vehicle electrical system battery, and the starter battery switch can be activated by the control device, and the starter battery switch is configured as a power MOSFET having a gate connected to the control device, wherein the control device performs the following steps:

a) sensing the initiation of a starting operation upon actuation of the starter;

b) generating a gate voltage that makes the MOSFET conductive;

c) continuously sensing the drain current of the MOSFET; and d) shutting off the gate voltage if a drain current profile indicates termination of the starting operation.

10. The method for activating a dual-battery system as defined in claim 9, wherein the system further includes at least one of a precrash or crash sensor, and wherein the control device inhibits the MOSFETs when a collision is sensed by the precrash sensor or the crash sensor.

* * * * *